F. W. HOOD.

REVOLVING FIRE ARM.

No. 10,257. Reissued Dec. 5, 1882.

Witnesses.
S. N. Piper
E. B. Pratt

Inventor.
Freeman W. Hood.
by R. H. Eddy, atty.

N. PETERS, Photo-Lithographer, Washington, D. C.

UNITED STATES PATENT OFFICE.

FREEMAN W. HOOD, OF NORWICH, CONNECTICUT.

REVOLVING FIRE-ARM.

SPECIFICATION forming part of Reissued Letters Patent No. 10,257, dated December 5, 1882.

Original No. 116,593, dated July 4, 1871. Application for reissue filed October 2, 1882.

*To all whom it may concern:*

Be it known that I, FREEMAN W. HOOD, of Norwich, in the county of New London, of the State of Connecticut, have invented a new and useful Improvement in Revolver Fire-Arms; and I do hereby declare the same to be described in the following specification and represented in the accompanying drawings, of which—

Figure 1:
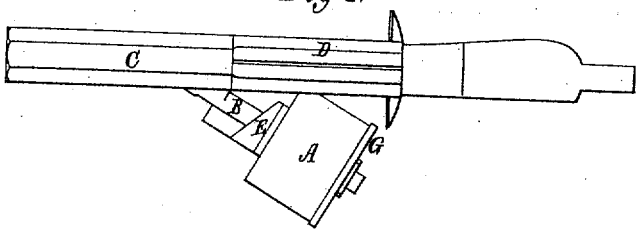
Figure 2:
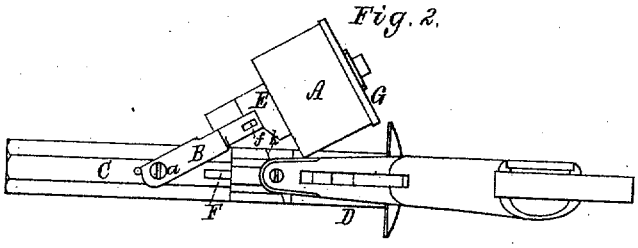
Figure 3:
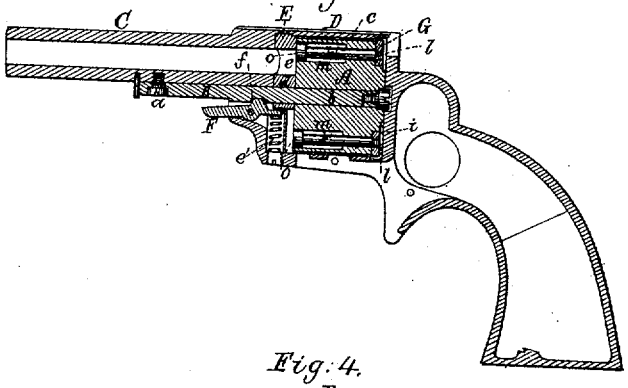

Figure 1 is a top view, and Fig. 2 a bottom view, of a pistol provided with my invention, the rotary charge-magazine being represented in such figures as drawn laterally out of the stock. Fig. 3 is a vertical and longitudinal section of the fire-arm, showing the charge-magazine as within the stock, or the chamber or space thereof for reception of such magazine.

In this pistol the rotary charge block or magazine A is pivoted upon a swinging arm, B, which, at or near its front end, is jointed or pivoted to the barrel C, the joint pin or pivot being seen at *a*. That part of the swinging arm on which the magazine revolves is shown at *b*, it being of sufficient length to admit the magazine to slide the necessary distance lengthwise on it.

Figure 4:
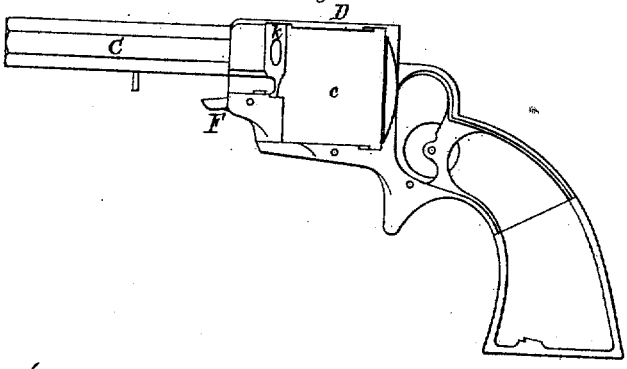

The recess in the stock D for the reception of the magazine is shown at *c*, especially in Fig. 4, which is a side view of it as it appears without the magazine and its appurtenances.

Figure 5:
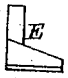
Figure 6:
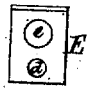

In advance of the magazine and upon the swinging arm is a slide-piece, E, formed as represented, and particularly in Fig. 5, which is a top view, and in Fig. 6, which is a rear elevation of it. It will be observed that it is a wedge-shaped block of metal, provided not only with a suitable opening, *d*, to receive the swinging arm, but with a bore or hole, *e*, corresponding in diameter with that of the barrel, and constituting a continuation of the bore of the barrel when the slide-piece is within its socket. The rear end of the barrel, or that part of the magazine-socket next to the front face of the slide-piece, is beveled to correspond with the bevel of the front of the slide-piece, and to operate as an abutment for the slide-piece, and to constitute a cam, *k*, to press it back while the magazine is in the act of being moved into its recess.

A lever-latch, F, provided with an actuating-spring, *e'*, pivoted in the stock and arranged as shown, serves, by catching into a recess or notch, *f*, in the swinging arm, when the latter is in its innermost position, to hold the arm and the magazine in place relatively to the stock, or while the piece may be fired.

The slide-piece E is to admit of the magazine being moved laterally out of its recess and into it, as occasion may require. The slide-piece enables the magazine to slide forward on its spindle while both are being moved out of the recess, the movement being sufficient to prevent the back of the recess from estopping the magazine. While the magazine is in the act of being moved inward the slide-piece, by the action of the beveled cam, will, with the magazine, be forced back on the spindle or pivot of the magazine, and when the magazine may be back in the recess such slide-piece will hold it in its rearmost position therein.

Figure 10:
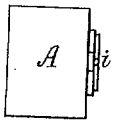
Figure 8:
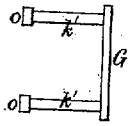
Figure 9:
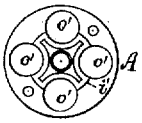
Figure 7:
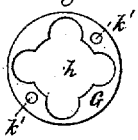

Against the rear end of the magazine is the cartridge-retractor G, it being formed as shown in rear view in Fig. 7 and in side view in Fig. 8. Fig. 9 is a rear end view, and Fig. 10 a side view, of the magazine without the retractor. The said retractor G is a disk or circular plate, perforated, as shown at *h*, to fit upon the rear part or projection, *i*, of the magazine. The retractor has a diameter a little greater than that of the magazine, and is connected to such magazine by two projecting pins, *k' k'*, that enter corresponding holes in the magazine and slide freely therein. The pins *k' k'* are kept in connection with the magazine and retractor by means of screws *l l*, screwed into said retractor, and heads *o o* on the other ends of the pins, said heads being larger in diameter than and projecting beyond the body of the pins, and arranged in stop sockets or bores *m m*, as shown. By taking hold of the retractor with the thumb and index-finger, applied to opposite parts of its periphery, the retractor, when the magazine is out of its recess, may be drawn backward, so as to extract at once from the magazine all the cartridges or cartridge-shells that at the time may be in the charge-chambers *o' o' o' o'* thereof.

I do not claim a cartridge-extractor as made and applied to a magazine in manner as shown in the United States Patent No. 49,912; nor do I claim anything described and shown in the United States Patent No. 26,919.

I claim—

1. The stock D, having its rotary-magazine-receiving chamber closed at bottom and open laterally to receive the magazine, in combination with the arm B, for supporting such magazine, pivoted to the stock or barrel so as to swing laterally or horizontally relatively thereof.

2. The magazine provided with the series of charge-chambers and with the retractor guide screw shouldered holes, as described, arranged between such chambers, and also with a cylindrical passage made through it (the said magazine) axially for reception of the swinging arm B, in combination with the stock D, having its rotary-magazine-receiving chamber closed at bottom and open laterally to receive the magazine, and with the said arm pivoted to the barrel so as to swing laterally under it, and with the retractor consisting of the perforated plate G and the headed screws $k'$, all being arranged and to operate substantially as set forth.

3. The wedged slide-piece E, arranged in advance of the rotary magazine, and adapted with it to slide on the pivoted arm B lengthwise thereof, in combination with the said arm and magazine, and with the stock provided with the abutment or cam $k$ arranged in it (the said stock,) and for operating the said slide-piece E, all being substantially as set forth.

FREEMAN W. HOOD.

Witnesses:

R. H. EDDY,

E. B. PRATT.